United States Patent
Hoffman, Jr. et al.

(10) Patent No.: US 10,124,446 B2
(45) Date of Patent: Nov. 13, 2018

(54) REVERSIBLE WORKBED SUPPORT MEMBERS FOR LASER CUTTING MACHINE

(71) Applicant: M&R PRINTING EQUIPMENT, INC., Roselle, IL (US)

(72) Inventors: Richard C. Hoffman, Jr., Lake Forest, IL (US); Boguslaw W. Magda, Wheaton, IL (US)

(73) Assignee: M&R Printing Equipment, Inc., Roselle, IL (US)

( * ) Notice: Subject to any disclaimer, the term of this patent is extended or adjusted under 35 U.S.C. 154(b) by 136 days.

(21) Appl. No.: 15/019,386

(22) Filed: Feb. 9, 2016

(65) Prior Publication Data

US 2016/0229003 A1    Aug. 11, 2016

Related U.S. Application Data

(60) Provisional application No. 62/114,861, filed on Feb. 11, 2015.

(51) Int. Cl.
*B23Q 3/00* (2006.01)
*B23K 37/04* (2006.01)
*B23K 26/38* (2014.01)
*B23K 10/00* (2006.01)

(52) U.S. Cl.
CPC .......... *B23K 37/0408* (2013.01); *B23K 10/00* (2013.01); *B23K 26/38* (2013.01)

(58) Field of Classification Search
CPC ..... B23K 37/0408; B23K 10/00; B23K 26/38
See application file for complete search history.

(56) References Cited

U.S. PATENT DOCUMENTS

| | | | | |
|---|---|---|---|---|
| 5,326,086 A | * | 7/1994 | Radencic | A47J 43/18 269/54.5 |
| 5,860,641 A | * | 1/1999 | Heath | A47J 47/005 269/289 R |
| 2013/0200051 A1 | * | 8/2013 | Hert | B23K 26/38 219/121.71 |

* cited by examiner

*Primary Examiner* — David Bryant
*Assistant Examiner* — Nirvana Deonauth
(74) *Attorney, Agent, or Firm* — Greensfelder, Hemker & Gale, P.C.

(57) ABSTRACT

A workbed comprises a plurality of parallel support members with each support member having a first edge with a contact surface of a specific configuration. A second, opposed edge with a second contact surface on the support member is also provided with the same specific configuration. As a result, instead of replacing the support member each time the first edge's support surface is worn or degraded, it can be flipped, or reversed so that the second, edge's support surface of the support member is used to form the workbed.

19 Claims, 7 Drawing Sheets

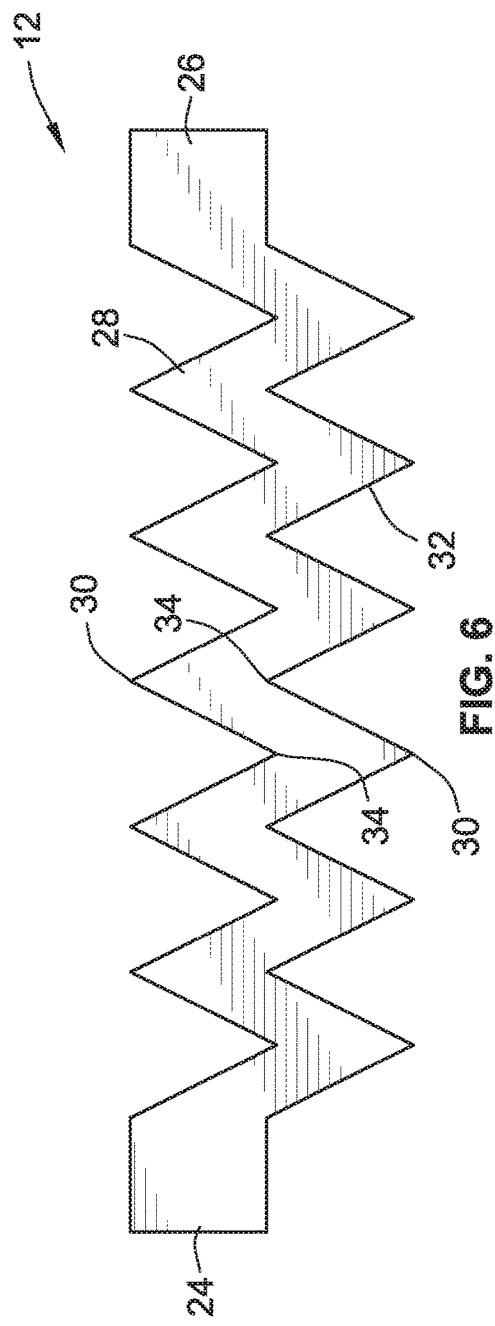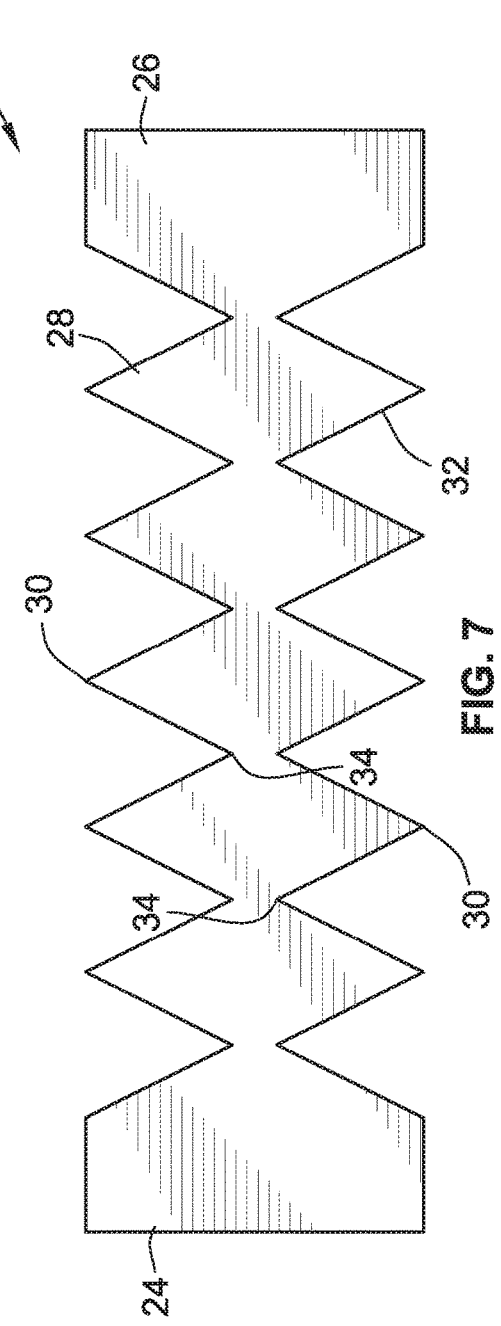

REVERSIBLE WORKBED SUPPORT MEMBERS FOR LASER CUTTING MACHINE

CROSS-REFERENCE TO RELATED APPLICATIONS

The present application claims the benefit of U.S. Provisional Patent Application No. 62/114,861, filed Feb. 11, 2015, the contents of which are incorporated herein by reference.

FEDERALLY SPONSORED RESEARCH OR DEVELOPMENT

N/A

TECHNICAL FIELD

The present invention generally relates to laser cutting machines, and in particular to reversible workbed support members.

BACKGROUND OF THE INVENTION

Laser or plasma cutting machines are used to cut workpieces such as metal sheets and parts. The workpieces are cut on a workbed. Current workbeds include a plurality of support members. These support members come in a number of shapes including a sawtooth shape.

A problem with support occurs in that the support members' contact or top surfaces wear over time. They also suffer degradation from the cutting process itself, and can accumulate dross or slag material as a result of the cutting process. Thus, the support members must be replaced frequently. When the support members' contact surfaces take the form of a sawtooth, this degradation can affect their ability to support the material being cut by the lasers.

There is a need for a support member that can be used more than once to reduce the cost and materials for such member. The present invention provides reversible workbed support members that reduce the need for replacement, thus saving materials and cost.

SUMMARY OF THE INVENTION

In an embodiment of the present invention, the workbed comprises a plurality of parallel support members. Each support member has a first edge with a contact surface having a specific configuration. A second, opposed edge on the support member is also provided with the same specific configuration. In this manner, instead of replacing the support member each time the first edge's contact surface is worn or degraded, it can be flipped or reversed so that the second, opposed edge and contact surface of the support member is used to form the workbed.

A workbed support member is provided. In a first embodiment, the member includes a first plurality of triangular portions along a first edge of the support member. It also includes a second plurality of triangular portions along a second opposite and parallel edge of the support member.

BRIEF DESCRIPTION OF THE DRAWINGS

To understand the present invention, it will now be described by way of example, with reference to the accompanying drawings in which:

FIG. 6 is a plan view of a workbed support member.

FIG. 7 is a plan view of a workbed support member in accord with an embodiment of the present invention.

DETAILED DESCRIPTION

Figure 1:
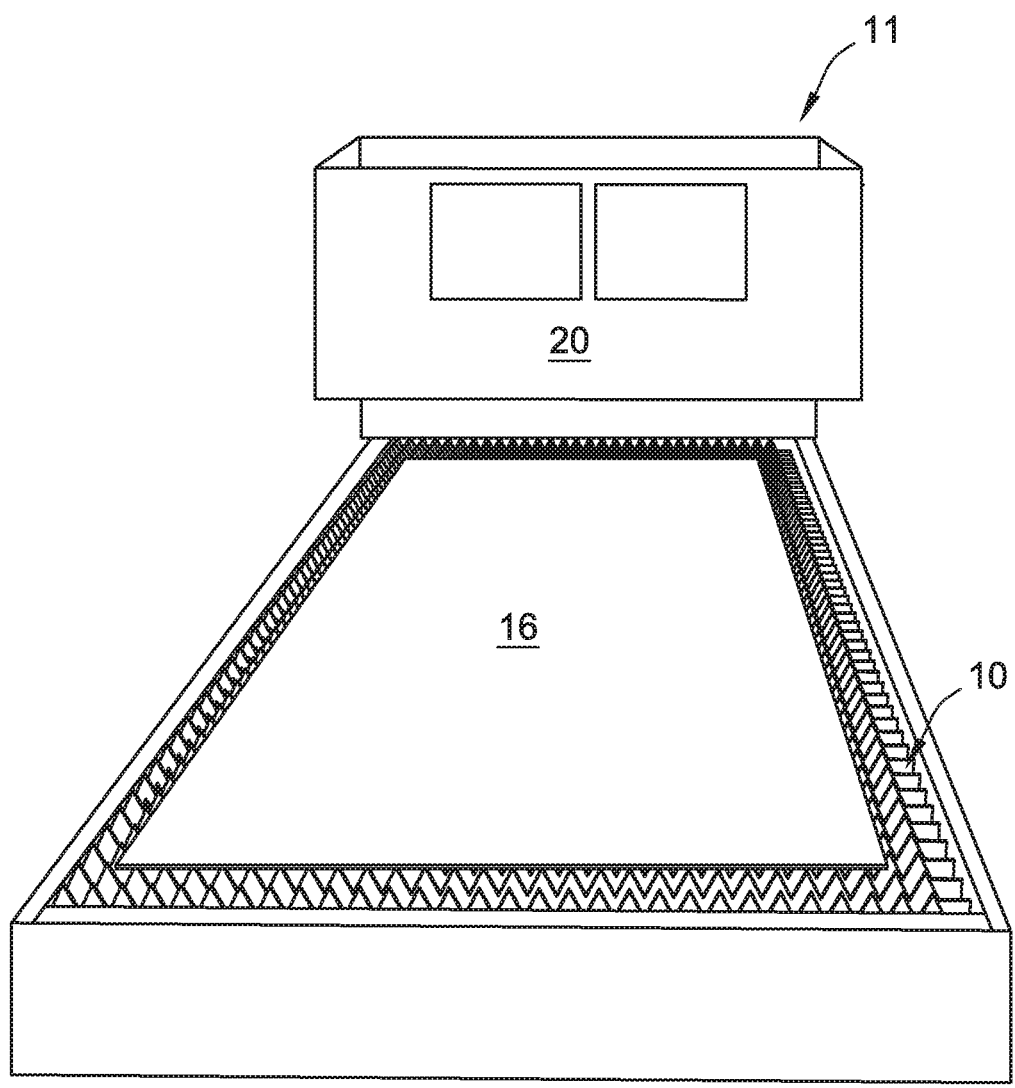
FIG. 1 is a perspective view of a laser cutting machine in accord with an embodiment of the present invention.
Figure 2:
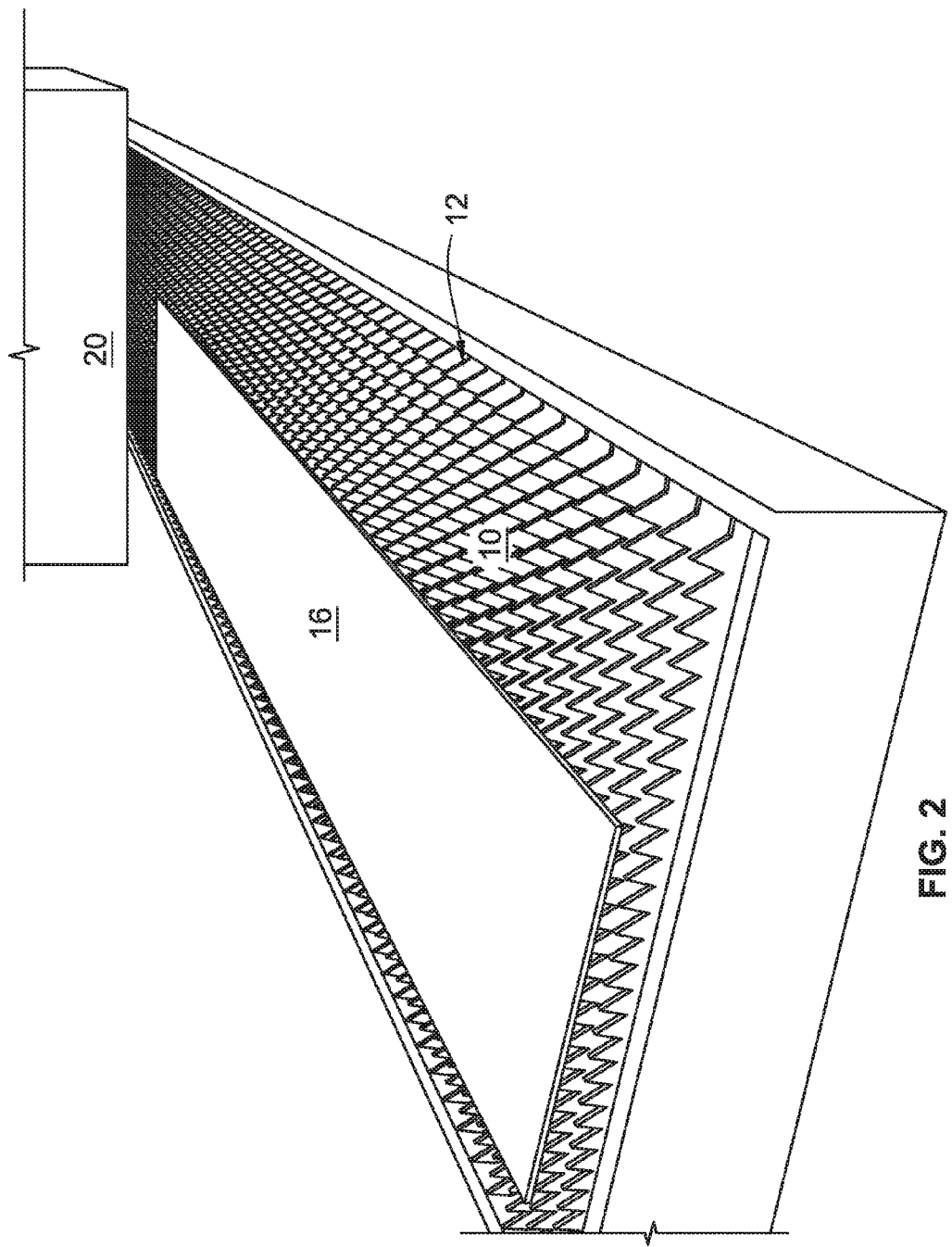
FIG. 2 is a perspective view of a laser cutting machine in accord with an embodiment of the present invention.
Figure 3:
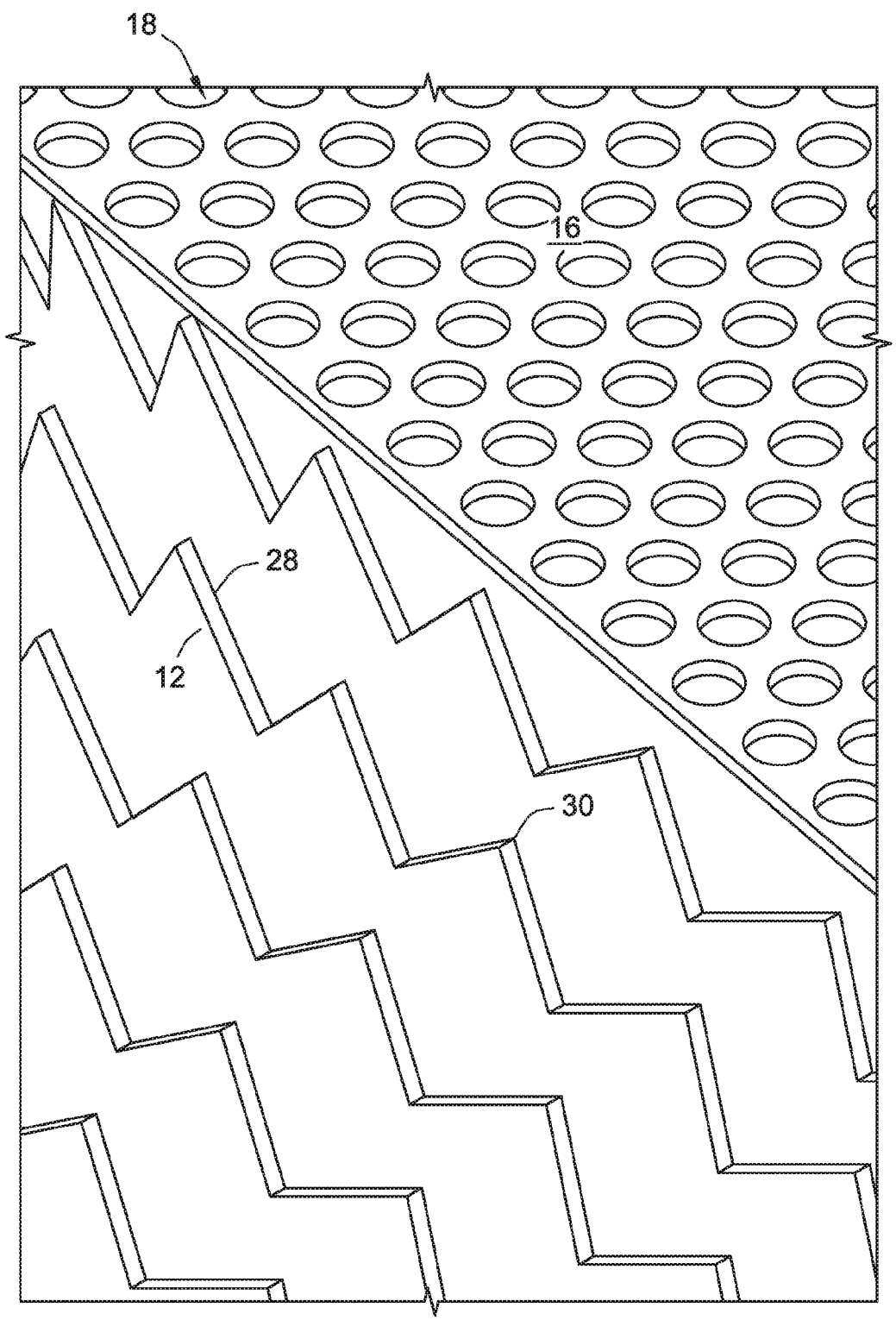
FIG. 3 is a perspective view of a workbed comprised of a plurality of parallel support members.
Figure 4:
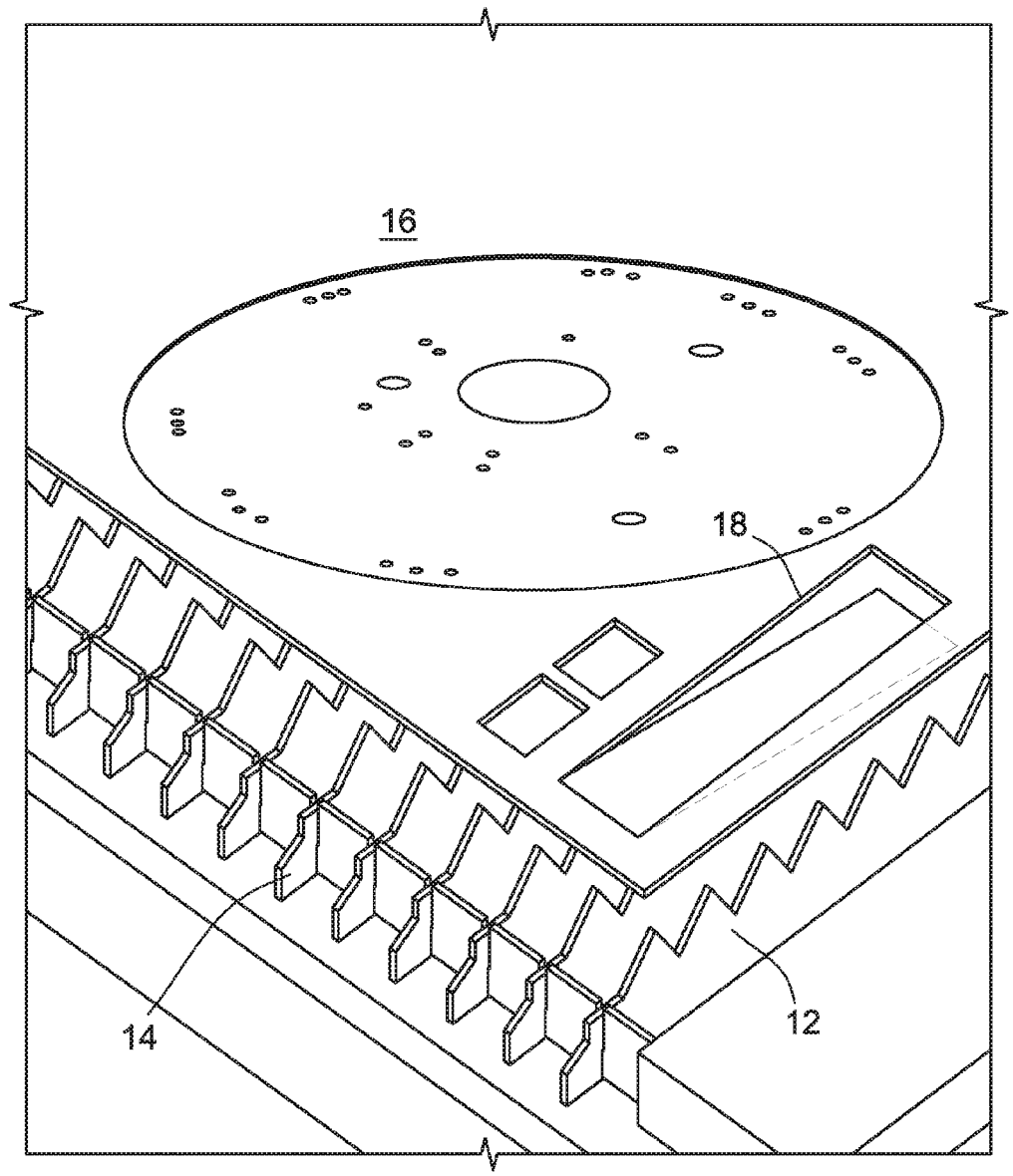
FIG. 4 is a further perspective view of a workbed and support members.
Figure 5:
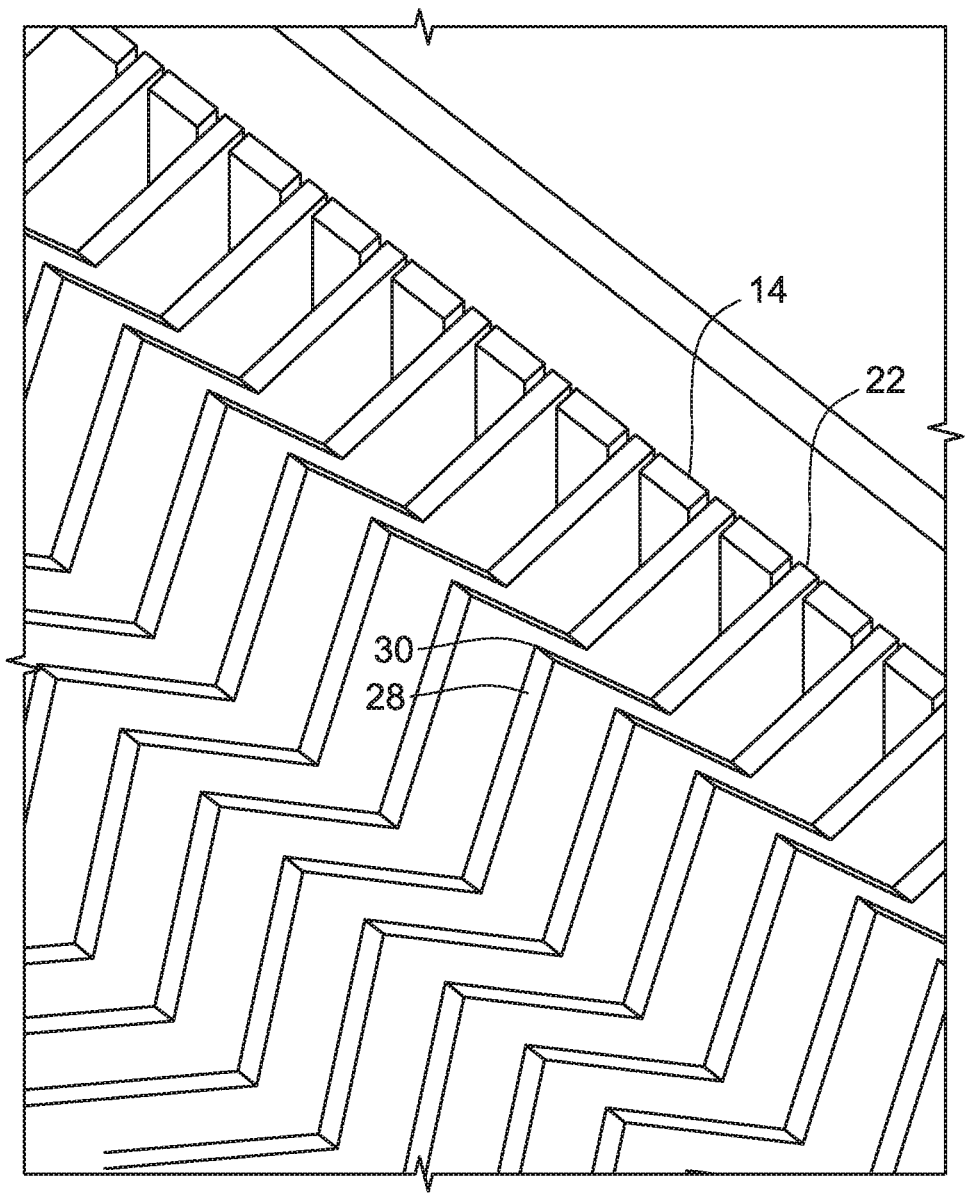
FIG. 5 is a still further perspective view of a workbed support member.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-5 show a workbed 10 for a laser or plasma cutting machine 11 having a plurality of workbed support members 12. The support members 12 are horizontally supported at their ends by and within a frame 14. The workbed 10 and individual workbed support members 12 support a workpiece 16 to be cut. The workpiece 16 is preferably metal, including sheet metal, but can be any suitable workpiece 16. The workpiece 16 includes cutout sections 18 that correspond to openings in the workpiece 16. The location, size, and orientation of cutout sections 18 are determined by the desired application of the workpiece 16. See, for example, FIGS. 3 and 4.

The cutting machine 11 has a cutting section 20. The cutting section 20 includes a laser that can be moved according to a pre-programmed sequence to create cutout sections 18 and other elements in the workpiece 16. The workbed 10 supports the workpiece 16 during the cutting operation.

The workbed support members 12 are each supported horizontally at their ends within the frame 14 such that they may be lifted in and out of the frame 14 as needed. The frame 14 includes slots 22 into which first and second ends 24 and 26 of the support members 12 can be inserted and removed.

The support members 12 can include raised portions of any desirables shape, including semicircular, trapezoidal, triangular, or rectangular. The support members 12 are also preferably made of stainless steel, but can be made of any suitable material. As shown in the Figures, a preferred shape of the raised portions is triangular or saw tooth. The saw tooth support members 12 include a plurality of triangular portions 28 along a first edge of the support 12. The triangular portion 28 can include a flattened tip 30. In accord with an embodiment of the present invention, the supports 12 also include a second plurality of triangular portions 32 along a second opposite edge of the support 12. The second plurality of triangular portions 32 permits the support members 12 to be reversible. That is, the support members 12 have triangular portions on either edge such that the member 12 can be removed, flipped over, and re-inserted into the frame 14. This essentially permits the support member 12 to be used twice, leading to less often replacement and use of fewer members 12 as compared to members 12 having triangular portions along only a single side.

Figure 8:
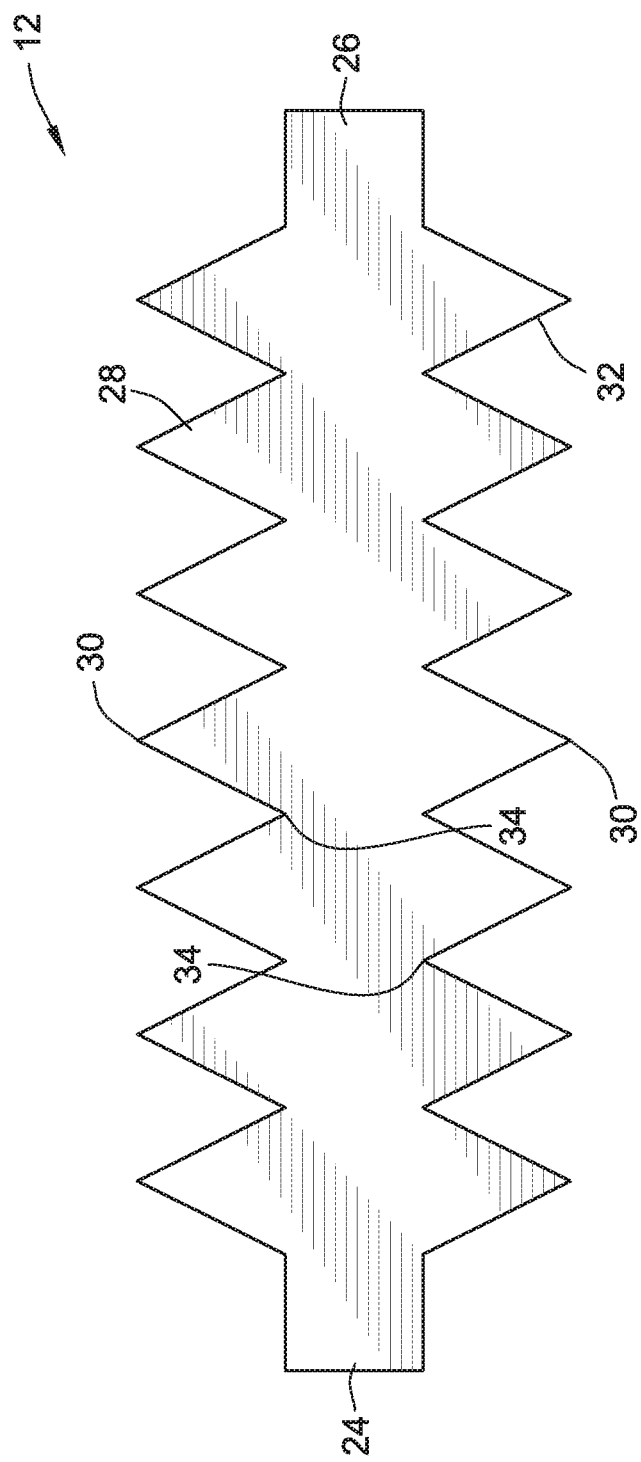
FIG. 8 is a further plan view of a workbed support member.

FIGS. 6-8 show several embodiments of the support members 12 of the present invention. FIG. 6 shows an embodiment where the first and second pluralities of triangular portions 28 and 32 are in phase such that the tips 30 align with troughs 34. FIGS. 7 and 8 show an embodiment where the first and second pluralities of triangular portions 28 and 32 are out of phase such that the tips 30 and troughs 34 are aligned with each other.

While the specific embodiments have been illustrated and described, numerous modifications come to mind without significantly departing from the spirit of the invention, and the scope of protection is only limited by the scope of the accompanying Claims.

What is claimed is:

1. A workbed with a reversible support member for a laser cutting machine comprising: a flat piece of material having a first end and a second end and having a first plurality of triangular portions along a first edge of the support member, wherein each triangular portion of the first plurality of triangular portions includes a tip extending from the flat piece of material in a first direction: and a second plurality of triangular portions along a second opposite edge of the support member, wherein each triangular portion of the second plurality of triangular portions includes a tip extending from the flat piece of material in a second direction opposite the first direction, wherein the support member directly supports a workpiece on the tips of the first plurality of triangular portions which can then be flipped so that the tips of the second plurality of triangular portions are then directly supporting a workpiece after the first plurality of triangular portions are worn or degraded.

2. The workbed support member of claim 1 wherein each tip of the first and second pluralities of triangular portions is flattened.

3. The workbed support member of claim 1 wherein the first and second pluralities of triangular portions are in phase.

4. The workbed support member of claim 1 wherein the first and second pluralities of triangular portions are out of phase.

5. A workbed with a reversible support member comprising: a flat piece of material having a first end and a second end and having a first plurality of raised portions extending from the support member in a first direction along a first edge of the support member and a second plurality of raised portions extending from the support member in a second direction opposite the first direction along a second opposite edge of the support member, wherein the support member directly supports a workpiece on the first plurality of raised portions which can then be flipped so that the second plurality of raised portions are then directly supporting a workpiece after the first plurality of raised portions are worn or degraded.

6. The workbed support member of claim 5 wherein the first and second pluralities of raised portions are semicircular.

7. The workbed support member of claim 5 wherein the first and second pluralities of raised portions are triangular.

8. The workbed support member of claim 5 wherein the first and second pluralities of raised portions are rectangular.

9. The workbed support member of claim 5 wherein the first and second raised portions include a flattened tip.

10. The workbed support member of claim 5 wherein the first and second pluralities of raised portions are in phase.

11. The workbed support member of claim 5 wherein the first and second pluralities of raised portions are out of phase.

12. The workbed support member of claim 1 wherein the support member is stainless steel.

13. The workbed support member of claim 5 wherein the support member is stainless steel.

14. The workbed support member of claim 1 wherein the support member is sized to fit in a frame of a laser cutting machine.

15. A workbed with reversible support members for a laser cutting machine comprising: a frame; a plurality of flat support members supported in the frame, each support member having a first plurality of triangular portions extending from the support member in a first direction along a first edge of the support member and a second plurality of triangular portions extending outward from the support member in a second direction opposite the first direction along a second opposite edge of the support member, a first end and a second end wherein each support member is connected to the frame at the support member's first end and second end, wherein the support member directly supports a workpiece on the first plurality of triangular portions which can then be flipped so that the second plurality of triangular portions are then directly supporting a workpiece after the first plurality of triangular portions are worn or degraded.

16. The workbed of claim 15 wherein each of the plurality of support members is stainless steel.

17. The workbed of claim 15 wherein the first and second pluralities of triangular portions for at least one of the plurality of support members includes a flattened tip.

18. The workbed of claim 15 wherein the first and second pluralities of triangular portions for at least one of the plurality of support members are in phase.

19. The workbed of claim 15 wherein the first and second pluralities of triangular portions for at least one of the plurality of support members are out of phase.

* * * * *